E. FÄSSLER.
ALTERNATING CURRENT RECTIFIER.
APPLICATION FILED OCT. 29, 1909.

1,131,919.

Patented Mar. 16, 1915.
2 SHEETS—SHEET 1.

WITNESSES:
L. L. Mead.
W. A. Alexander

INVENTOR
Ernst Fässler
BY
Fowler & Huffman
ATTORNEY

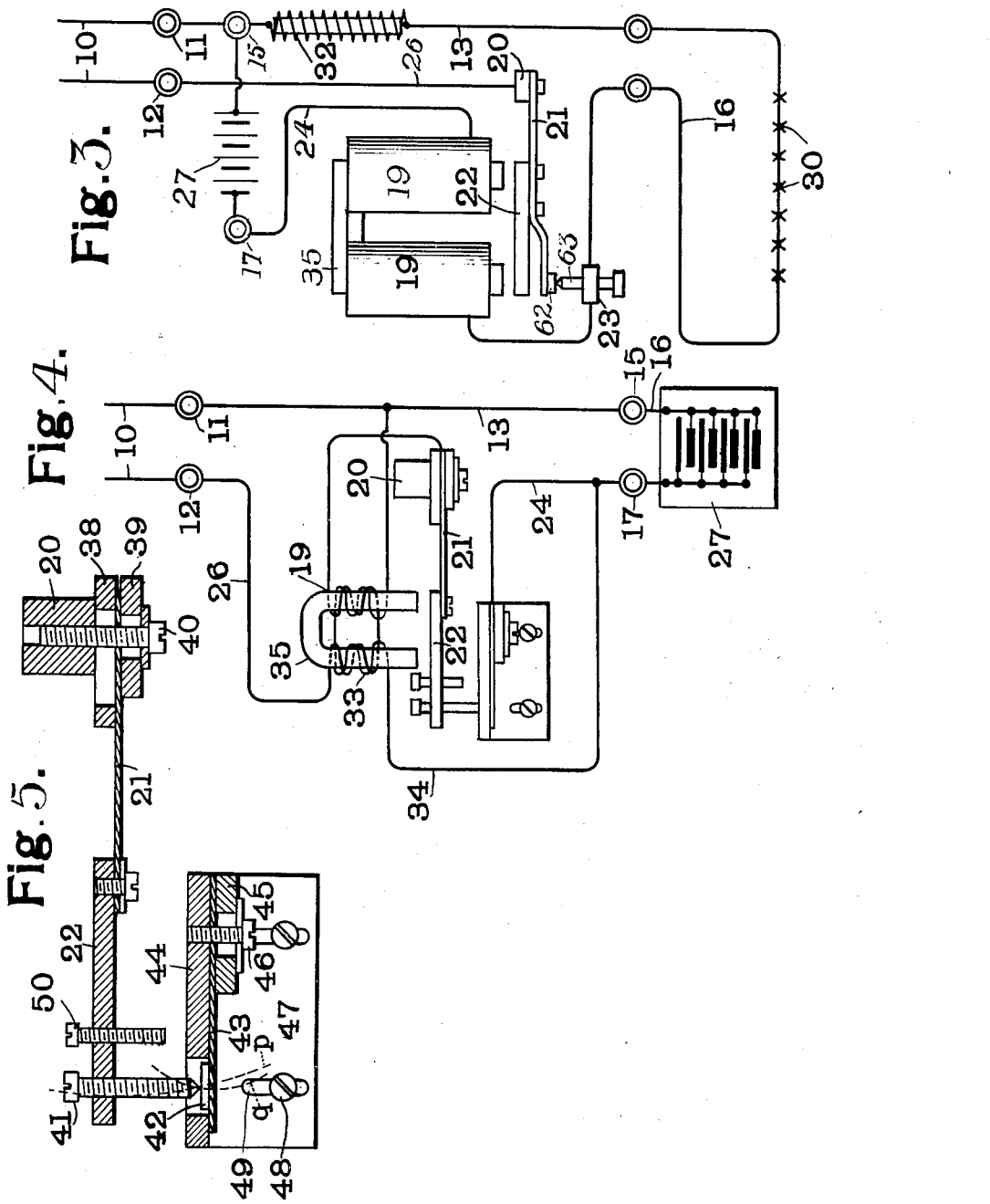

UNITED STATES PATENT OFFICE.

ERNST FÄSSLER, OF FRANKFORT-ON-THE-MAIN, GERMANY, ASSIGNOR TO WAGNER ELECTRIC MANUFACTURING COMPANY, OF ST. LOUIS, MISSOURI, A CORPORATION OF MISSOURI.

ALTERNATING-CURRENT RECTIFIER.

1,131,919. Specification of Letters Patent. Patented Mar. 16, 1915.

Application filed October 29, 1909. Serial No. 525,307.

*To all whom it may concern:*

Be it known that I, ERNST FÄSSLER, a subject of the Emperor of Germany, residing at Frankfort-on-the-Main, in the Empire of Germany, have invented a certain new and useful Alternating-Current Rectifier, of which the following is such a full, clear, and exact description as will enable any one skilled in the art to which it appertains to make and use the same, reference being had to the accompanying drawings, forming part of this specification.

My invention relates to vibrating rectifiers adapted to change alternating into pulsating or unidirectional current, one of its objects being to provide an apparatus of this type in which the armature is not polarized.

A further object is to produce a rectifying device particularly well suited for charging storage batteries.

Other objects and advantages of my invention will appear from the following specification.

In carrying out my invention I provide an electromagnet and a "tuned" armature adapted when in normal operation to vibrate within the influence of said electromagnet and with the same frequency as the alternating E. M. F. of the supply. For reasons more fully set forth hereinafter I, however, so "tune" the armature that its natural frequency of vibration shall be very near to but appreciably different from the frequency of the source of alternating current to which the apparatus is to be connected and I make use of the vibrations of said armature to open and close the consumption circuit at the proper intervals. I also provide means whereby the electromagnet is threaded at starting by an alternating flux with unequal maxima of opposite sign and in normal operation is threaded by a pulsating flux. In this way I am able to definitely determine the direction of the rectified current delivered to the consumption circuit.

Figure 1:
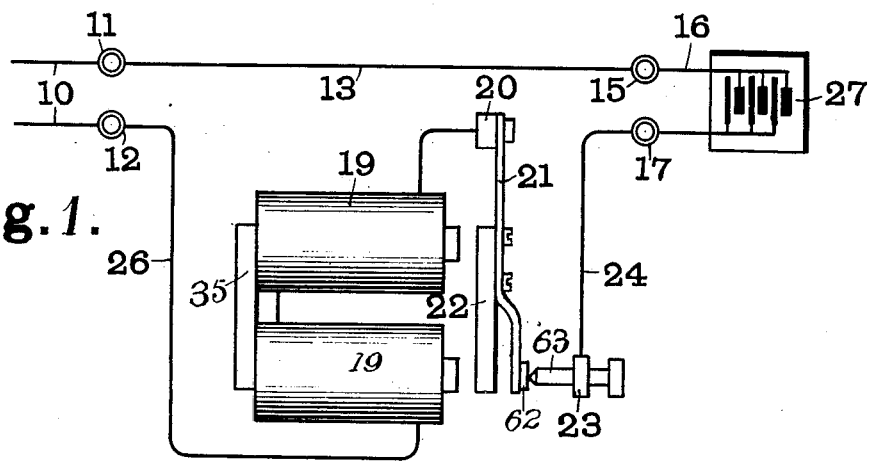
Figure 2:
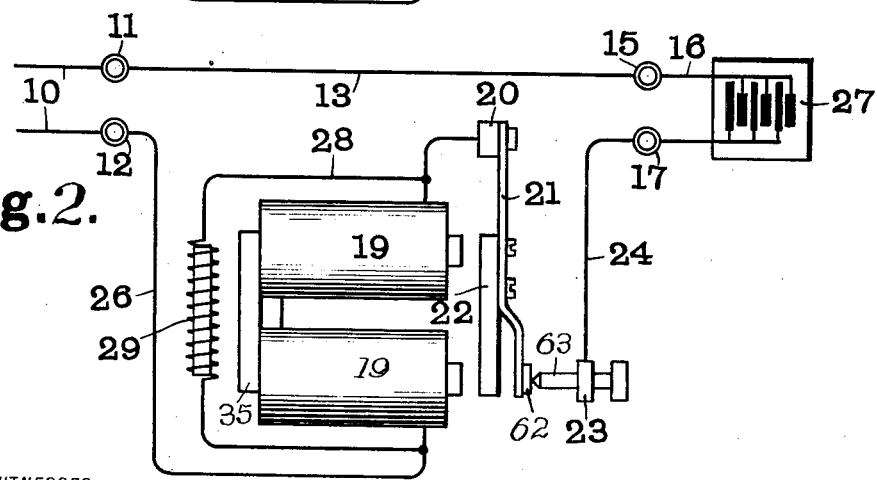

In the accompanying diagrammatic drawings which illustrate some forms of apparatus embodying my invention, Figure 1 shows a form specially adapted for charging storage batteries; Fig. 2 is similar to Fig. 1 except that the electromagnet is excited by only a part of the charging current; Fig. 3 shows how the rectifier of Fig. 1 can be economically used to charge a storage battery and to simultaneously feed some other translating devices; Fig. 4 shows additional exciting coils on the magnet, while Fig. 5 shows part of Fig. 4 in greater detail.

Referring to Fig. 1, alternating current at a suitable pressure is taken to the terminals 11, 12 of the rectifier by way of the leads 10 while the consumption circuit which in this case comprises the storage battery 27 is connected to the terminals 15, 17. The terminals 11 and 15 are joined together by the wire 13. The magnet 35 energized by the exciting coils 19 and the armature 22 located within the influence of the magnet 35 and attached to the spring 21 which is clamped at one end to the support 20, are connected between the terminals 12 and 17. At its other end the spring 21 carries a contact 62 and is so adjusted that when at rest 62 is pressed against the adjustable screw 63 held in the block 23. The spring is so suspended as to be capable of vibrating about 20; when 21 vibrates, carrying the armature 22 with it, then one pole of the consumption circuit is alternately connected to and disconnected from the mains at the contact 62 because the terminal 12 is connected to the terminal 17 by way of the conductor 26, the exciting coils 19, the block 20, the spring 21, the contact 62, the screw 63, the block 23 and the conductor 24. In other words, the exciting coils of the rectifier are connected in series with the contact controlled by the magnet energized by said coils. This apparatus will deliver rectified current to the consumption circuit provided the armature 22 is properly "tuned", *i. e.*, provided the natural frequency of the spring 21 carrying the armature 22 is properly chosen.

A spring mounted armature such as made use of in this apparatus will vibrate at the same frequency as that of the alternating supply to which the electromagnet coöperating with said armature is connected, but the relation of the phase of the armature vibrations to the phase of the alternations of the alternating E. M. F. impressed on the electromagnet or to the phase of alternations of the exciting current, or to that of the magnetic flux in said magnet, will depend on the "tuning" of the armature. If the armature, or, more generally, the vibrating element, is so "tuned" as to have a natural frequency equal to that of the supply, then its vibrations, when subjected to the influence of the electromagnet will be in phase with the alternations of the magnetic flux. If the natural frequency of the armature is chosen slightly higher or slightly lower than that of the supply, the phase of its vibrations will lead or will lag behind the alternations of the magnetic flux set up in the electromagnet coöperating with said armature. Satisfactory operation of this rectifier requires that the current be interrupted at the correct instant. Owing to the effect of hysteresis, there is a time phase difference between the current and the magnetic flux of an electromagnet. The vibrations of the armature should be in phase with the current rather than with the flux and this desired phase relation between current alternation and armature vibrations is brought about by the "tuning" referred to.

The operation of my improved rectifier when used to charge a storage battery is somewhat as follows: Before the battery 27 is connected to the terminals 15, 17, the E. M. F. at these terminals is a purely alternating one but no current flows through the coils 19 because their circuit is not completed. If 15 and 17 were joined together by a wire, then a purely alternating current would flow through the coils 19 and the armature 22 could receive its initial impulse either during the positive or during the negative alternation or half cycle, but if the battery 27 is connected to the consumption terminals of the rectifier then the coils are subjected to an E. M. F. which is the resultant of the alternating E. M. F. derived from the mains and of the unidirectional E. M. F. derived from the battery. The two component E. M. F.'s should be so chosen that their resultant is an alternating E. M. F. with unequal maxima of opposite sign. When this is the case then the current through the coils 19 as well as the magnetic flux through the magnet 35 will be alternating but their positive maximum will be greater than their negative maximum or vice versa. The strength of the spring 21 of my improved rectifier is so chosen that said spring will withstand the attraction of the smaller maximum of the magnetic flux of one sign without interrupting the circuit at the contact 62 but will respond to the greater maximum of the flux of the opposite sign sufficiently to break the circuit at 62 and to be set in vibration. Thus by causing the electromagnet to be threaded at starting by an alternating flux having unequal maxima of opposite sign and by suitably adjusting the strength of the spring carrying the armature coöperating with said electromagnet, I positively determine the half cycle during which the armature will receive its initial impulse and thus positively settle the polarity of the consumption terminals. When, as is the case in Fig. 1, the unequal maxima of the flux threading the electromagnet just before the armature begins to vibrate are determined by the E. M. F. of the battery to be charged, then no matter which pole of the battery is connected to either of the terminals 15 or 17 the rectified current will always be of such a direction as to charge the battery. Suppose the maximum value of the alternating E. M. F. to be 5 volts and the value of the unidirectional E. M. F. to be 2 volts. Let the battery be so connected to the terminals 15, 17, that its E. M. F. is added to the alternating E. M. F. during the positive alternation, then the maximum resultant E. M. F. during the positive alternation will be 7 volts while it will only be 3 volts during the negative alternation. The alternating flux will be greatest during the positive alternation and the armature will be set in vibration during that alternation being first attracted toward the electromagnet thus interrupting the consumption circuit at a time when the battery can discharge should said circuit remain closed. On the return journey or the rebound of the armature which should take place during the negative alternation, the contact 62 will be closed at a time when the alternating E. M. F. opposes the battery E. M. F. and is therefore of the required direction to charge the battery. This contact should remain closed until the current due to the resultant E. M. F. has become zero or thereabout. In order to insure that the rebound of the armature shall eventually take place at the right time, it is necessary that the natural frequency of vibration of the vibrating element, i. e. of the spring weighted by the armature it carries be somewhere near that of the frequency of the alternating E. M. F. In order that the contact 62 shall remain closed during the required time and particularly that it shall open the circuit when the charging current is nearly or quite zero it is necessary that the amplitude of the armature vibrations be sufficient and that the natural frequency of the spring plus the armature be chosen a little higher than that of the alternating E. M. F. so as to cause the time phase of the armature vibration to lead the time phase of the flux variation and thus to compensate for the lag of the magnetic flux behind the charging current. Since the circuit of the electromagnet is periodically interrupted during the operation of the rectifier the flux threading said magnet in normal operation is pulsating and, therefore, produces the same effect as an alternating flux. Because of the pulsating and, therefore, intermittent nature of this flux, the phase of the armature vibration can be more definitely defined by referring it to the phase of the alternating E. M. F. The conditions to be fulfilled may, therefore, also be defined by stating that the phase of the armature vibrations must lag behind the phase of the alternating E. M. F. impressed upon the apparatus. If the connections of the battery to the terminals 15, 17 are reversed, then the direct current E. M. F. is added to the negative alternation of the alternating E. M. F. which is now of same direction as the battery E. M. F. and therefore unsuitable for charging the latter. The maximum resultant E. M. F. during the negative alternation will be 7 volts and will sink to 3 volts during the positive alternation. The vibration of the armature will therefore be initiated during the negative instead of the positive alternation and the rebound of the armature will take place during the positive alternation during which the resultant E. M. F. is opposed to the battery E. M. F. and can therefore send a charging current into the battery. The greater maximum of the alternating flux threading the magnet 35 at starting sets the armature in vibration and interrupts the circuit. When the armature rebounds closing the circuit during the correct half cycle or a part of it, the electromagnet is again energized by the charging current or a part thereof. The charging current lags behind the charging E. M. F. by nearly 90 degrees on account of the self induction of the exciting coils 19 and the flux through 35 lags a little behind said current with the result that 35 does not get magnetized and does not begin to exert an appreciable attraction on the armature until about ¼ of a cycle after the rebound of the armature has closed the charging circuit. But ¼ of a cycle after that time the armature again begins to approach the electromagnet 35 and is aided in that movement by the increasing magnetization of 35. It is during this first ¼ cycle of the travel of the armature in the direction of 35 that it receives in normal operation, the impulse which keeps it vibrating.

Fig. 2 only differs from Fig. 1 in that the exciting coils 19 of the electromagnet are shunted by an impedance 29 thereby relieving the coils from the necessity of carrying all the current. The impedance of the shunt circuit should be the same as that of the exciting coils.

It will be obvious that nothing in the operation of Fig. 1 will be changed if the coils 19 of the electromagnet are connected between the points 23 and 17 instead of between the points 12 and 20. If this be done then the rectifier can be used to charge the battery 27 and to simultaneously supply other translating devices without it being necessary to dimension the exciting coils 19 to carry the whole of the rectified current. This change in the connections of Fig. 1 is illustrated in Fig. 3 in which the rectifier also supplies current to lamps 30. One circuit in Fig. 3 may be traced from terminal 12 through the spring mounted armature 21, 22, the contacts 62, 63, the magnet coils 19, and the battery 27 to the terminal 11, while the other comprises spring mounted armature 21, 22, contacts 62, 63, the lamps 30, and the impedance 32. This impedance is inserted for the purpose of adjusting the phase of the current in the lamp circuit to coincide as nearly as possible with the phase of the current in the battery circuit and thus avoid sparking at the contacts 62, 63.

In the examples described so far I have shown how an alternating flux with unequal maxima of opposite polarity could be set up at starting in the electro-magnet forming part of my improved rectifier, by impressing on its exciting coils a unidirectional E. M. F. connected in series with an alternating E. M. F. In Fig. 4 is shown a way of achieving the same result by impressing on the magnet 35 a unidirectional as well as an alternating magneto motive force. This figure differs from Fig. 1 in that the magnet 35 carries two sets of coils instead of one only. The turns 19 are connected in series with battery 27 and the source of alternating current, and are therefore traversed by an alternating current with unequal maxima of opposite polarity at starting and by a pulsating current in normal operation while the coils 33 which are connected to the terminals of the battery 27 and are traversed by a unidirectional current only. This unidirectional current which of course produces a unidirectional M. M. F. can be derived from any desired source, and can, for instance, be taken from the consumption circuit itself as is the case in Fig. 4. It is clear that in Fig. 4 the alternating flux with unequal maxima of opposite polarity is produced at starting by combining both of the above named methods, i. e., the impressing of alternating and unidirectional E. M. F.'s and the superimposing of unidirectional and alternating M. M. F.'s on the exciting coils 19. A superposition of M. M. F.'s also occurs because coil 33 produces a unidirectional while coil 19 produces an alternating M. M. F. Fig. 4 also indicates a modified form of interrupter which I have found to operate more satisfactorily than the simple form of contacts 62, 63 shown in the previous figures. Fig. 5 gives a detail view of this improved and easily adjustable form. In the construction shown in Fig. 5 the spring 21 carrying the armature 22 is secured between two clamping plates 38 and 39 respectively which may be independently moved so as to vary the free length of the spring 21. The clamping plates 38 and 39 are held by means of a screw 40. Carried by the armature 22 is an adjustable contact screw 41 bearing on a contact piece 42 carried by a spring 43. This spring 43 bears against a stop plate 44 and is held in position by means of an adjustable clamping plate 45 which may be tightened or loosened by means of screw 46. By moving the clamping plate 45 the free length of the spring 43 may be varied. The stop plate 44 is carried by a plate 47 held in position by screws 48 passing through slots 49 so that the plate 44 may be moved toward or away from the armature 22. The armature 22 is also preferably provided with a screw 50 striking against the stop plate 44 so as to form a positive stop for the armature in one direction. This arrangement of contacts enables the natural frequency of vibration of the springs and armature combination to be readily adjusted and also permits of an easy variation of the time during which the consumption circuit is to remain closed. The fact that the screw 41 travels along the curve $p$ while the contact 42 travels along the curve $q$ produces friction between 41 and 42 insures a better contact between them and exerts a beneficial effect on the performance of the apparatus.

Having fully described my invention, what I claim as new and desire to secure by Letters Patent of the United States, is:

1. In an alternating current rectifier, the combination with a source of alternating E. M. F., of an electromagnet connected to said source, a non-polarized armature for said magnet, said armature having a natural frequency of vibration approximating the frequency of the alternating E. M. F., but sufficiently different therefrom that the phase of the actual vibration of the armature resulting from the influence of the exciting flux of the magnet and the armature's natural frequency, shall correspond to the phase of the exciting current, and a circuit interrupter operated by said armature.

2. In an alternating current rectifier, the combination with a source of alternating E. M. F., of an electromagnet having an exciting coil connected in series with said source, a non-polarized armature for said magnet, said armature having a natural frequency of vibration approximating to but appreciably different from the frequency of the alternating E. M. F., and means operated by said armature for breaking the circuit through said magnet.

3. In an alternating current rectifier, the combination with a source of alternating E. M. F., of an electromagnet having an exciting coil connected in series to said source, means for supplying an auxiliary E. M. F. to said magnet, an armature for said magnet, said armature having a natural frequency of vibration approximating to but appreciably different from the frequency of the alternating E. M. F., and a circuit interrupter operated by said armature.

4. In an alternating current rectifier, the combination with a source of alternating E. M. F., of an electromagnet connected to said source, a source of unidirectional E. M. F. in series circuit with said magnet and with the source of alternating E. M. F., an armature for said magnet, said armature having a natural frequency of vibration approximating to but appreciably different from the frequency of the alternating E. M. F., and a circuit interrupter operated by said armature.

5. In an alternating current rectifier, the combination with a source of alternating E. M. F., of a source of unidirectional E. M. F., an electromagnet, said electromagnet and said sources being in series circuit, a non-polarized armature operated by said magnet, and means operated by said armature for breaking the alternating current circuit through the magnet.

6. In an alternating current rectifier, the combination with a source of alternating E. M. F., of an electromagnet provided with two coils, one of which is connected to said source, means for supplying a unidirectional E. M. F. to the other coil of said magnet, a non-polarized armature for said magnet, said armature having a natural frequency of vibration approximating to but appreciably different from the frequency of the altenating E. M. F., and means operated by the armature for breaking the circuit through the magnet coil connected to the alternating current source.

7. In an alternating current rectifier, the combination with a source of alternating E. M. F., of an electromagnet having an exciting coil connected to said source, a non-polarized vibratile element having a natural frequency of vibration approximating to but appreciably different from the frequency of the alternating E. M. F., and means operated by said vibratile element for breaking the circuit through the exciting coil.

8. In an alternating current rectifier, the combination with a source of alternating E. M. F., of an electromagnet connected to said source, a non-polarized spring-mounted armature for said magnet, said armature having a natural frequency of vibration approximating the frequency of the alternating E. M. F., but sufficiently different therefrom that the phase of the actual vibration of the armature resulting from the influence of the exciting flux of the magnet and the armature's natural frequency, shall correspond to the phase of the exciting current and a contact coöperating with said armature to form a circuit interrupter.

9. In an alternating current rectifier, the combination with a source of alternating E. M. F., of an electromagnet connected to said source, a non-polarized spring-mounted armature for said magnet, said armature having a natural frequency of vibration approximating the frequency of the alternating E. M. F., but sufficiently different therefrom that the phase of the actual vibration of the armature resulting from the influence of the exciting flux of the magnet and the armature's natural frequency, shall correspond to the phase of the exciting current, means for varying the free length of said spring, and a contact coöperating with said armature to form a circuit interrupter.

10. In an alternating current rectifier, the combination with a source of alternating E. M. F., of an electro-magnet connected to said source, a spring mounted armature for said magnet, means for varying the free length of the spring when moving at one side of its neutral position, other means for varying the free length of the spring when moving at the other side of its neutral position, and a contact coöperating with said armature to form a circuit interrupter.

11. In an alternating current rectifier, the combination with a source of alternating E. M. F., of an electro-magnet connected to said source, a spring mounted armature for said magnet, a second spring carrying a contact adapted to coöperate with the armature to form a circuit interrupter, and a stop limiting the movement of said second spring in one direction.

12. In an alternating current rectifier, the combination with a source of alternating E. M. F., of an electro-magnet connected to said source, a spring mounted armature for said magnet, a second spring carrying a stop adapted to coöperate with said armature to form a circuit interrupter, a stop for limiting the movement of said second spring in one direction, and means for varying the free length of said second spring.

13. In an alternating current rectifier, the combination with a source of alternating E. M. F., of an electro-magnet connected to said source, a spring mounted armature for said magnet, means for varying the free length of said spring when moving at one side of its neutral point, other means for varying the free length of said spring when moving at the other side of its neutral point, a second spring carrying a contact adapted to coöperate with said armature to form a circuit interrupter, means for limiting the movement of said second spring in one direction, and means for varying the free length of said second spring.

In testimony whereof I have hereunto set my hand and affixed my seal in the presence of the two subscribing witnesses.

ERNST FÄSSLER. [L. S.]

Witnesses:
LEO MUELLER,
JEAN GRUND.